Patented Jan. 6, 1942

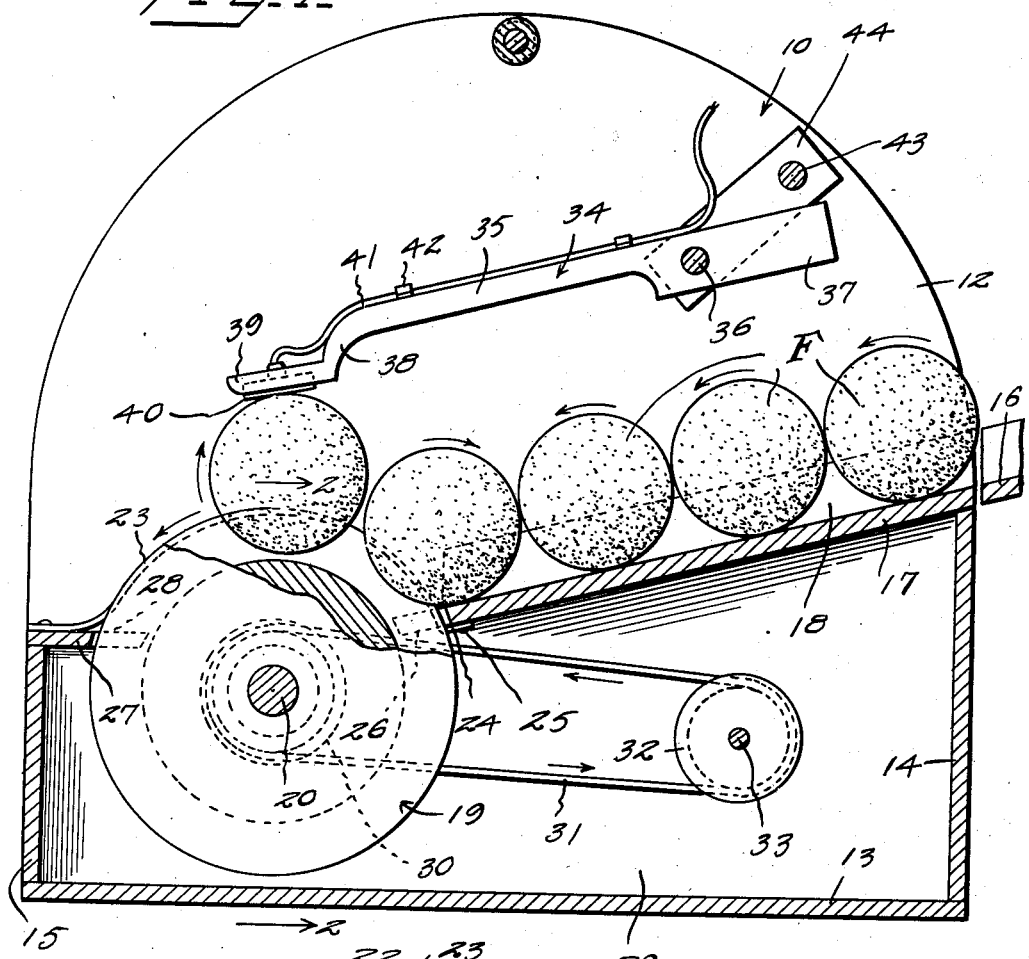

2,268,797

UNITED STATES PATENT OFFICE 2,268,797

FRUIT BRANDING MACHINE

Elbert Breshear, Jr., McAllen, Tex., assignor to Tedder Fruit Branding Machine Company, Inc., McAllen, Tex.

Application October 15, 1940, Serial No. 361,307

9 Claims. (Cl. 101—7)

This invention relates to fruit branding machines, and more particularly to a machine adapted to be positioned at one end of a conveyor for branding the fruit as it leaves the conveyor.

An object of this invention is to provide a fruit branding device of simple construction, which includes an electrically heated branding element for burning or searing the skin of the fruit so that the mark cannot be eradicated without damaging the skin.

Another object of this invention is to provide an improved means for rotating or rolling the fruit beneath the branding element, the rotating means being so formed as to be capable of use with different sizes of fruit.

A further object of this invention is to provide a branding machine of this kind, which includes a substantially balanced pivoted brand carrier in the form of a lever to which the branding element is attached.

A further object of this invention is to provide a device of this kind including an inclined guide or runway, at the lower end of which is positioned a grooved fruit rotating or rolling wheel for reversely rotating the fruit as it passes beneath the branding element.

To the foregoing objects and to others which may hereinafter appear, the invention consists of the novel construction, combination and arrangement of parts as will be more specifically referred to and illustrated in the accompanying drawing, wherein is disclosed an embodiment of the invention, but it is to be understood that changes, variations and modifications may be resorted to which fall within the scope of the invention as claimed.

In the drawing:

Figure 1 is a longitudinal section partly broken away of a fruit branding machine constructed according to an embodiment of this invention, and Figure 2 is a fragmentary sectional view taken on the line 2—2 of Figure 1.

Referring to the drawing, the numeral 10 designates generally a frame structure which is adapted to be positioned at the discharge end of an endless conveyor or runway and along which fruit to be branded is moving. The fruit to be branded may be citrus fruit or any other fruit on the skin of which it is desired to place a brand. The frame 10 comprises a pair of side or vertical frame members 12, which at their lower ends are secured to a bottom wall 13. A rear end wall 14 is secured between the two side walls 12 and to the bottom wall 13. A forward or front wall 15 is secured between the two side walls 12 and to the bottom wall 13 and, preferably the front wall 15 is of less height than the rear wall 14. The runway or conveyor, along which the fruit is adapted to move, is fragmentarily shown at 16. It will be understood that the runway or guide member 16 may be in the form of an inclined surface or may be one end of an endless conveyor.

An inclined runway or guide 17 is disposed between the two side walls 12, the rear end of the runway 17 being disposed over the upper edge of the rear wall 14. A pair of fruit guiding members 18 are secured to the opposite longitudinal edges of the runway 17 and also to the side walls 12, so that when the fruit F rolls downwardly over the runway 17 the fruit will be held against undue lateral shifting by means of the guide members 18.

A wheel, generally designated as 19, is fixed to a drive shaft 20, which is journalled in bearings 21 carried by the side wall members 12. The wheel 19 is preferably provided with a substantially V-shaped peripheral groove 22 within which the fruit F is adapted to engage. The wheel 19 is formed with a peripheral V-shaped groove in order that the fruit F may be engaged at a pair of spaced points when the fruit is at the lower end of the runway 17, thus providing an additional friction surface between the wheel 19 and the fruit so that the fruit F upon coming into contact with the groove 22 of the wheel will be reversely rotated from the rotation of the fruit as it moves downwardly over the runway 17. A pair of guard members 23 of longitudinally arcuate configuration are disposed on opposite sides of the wheel 19, the guard members 23 having an arc coincident with the outer periphery of the wheel 22, so that the fruit will not be able to engage the outer edges of the wheel 19. The rear ends of the guards or shields 23 are formed with a flange or extension 24 secured by a fastening device 25 to the under forward edge of the runway 17. The runway 17 at its forward lower end may be provided with a V-shaped extension 26 loosely engaging within the groove 22, so as to substantially close the groove or channel in the wheel 19 at the lower end of the runway.

A horizontally disposed forward wall 27 is secured between the two side wall members 12 on the forward side of the wheel 19, and the forward wall 27 in the present instance is secured to the upper edge of the front or forward wall 15.

The forward upper wall 27 may also be provided with a V-shaped extension 28 engaging loosely within the groove 22 so as to prevent any small particles from dropping down into the chamber 29 below the top wall 27 and below the runway 17.

The wheel 19 in the present instance is rotated by means of a pulley 30, which is fixed to the shaft 20 and a flexible drive member 31 is trained about the pulley 30 and is also trained about a drive pulley 32, which is fixed to a drive shaft 33. The drive shaft 33 is adapted to be connected to any suitable source of power supply. It will be understood that if desired the source of power supply may be connected directly to the wheel shaft 20.

A branding element carrier, generally designated as 34, is disposed within the frame 10 between the side walls 12 and above the runway 17. The carrier 34 is constructed in the form of an elongated lever 35, which is pivotally mounted on a pivot member 36 extending between the side walls 12 and above the runway 17. The rear end of the carrier 34 has formed therewith or secured thereon a balancing weight 37, so as to relieve the forward end of the lever or carrier 34 from undue weight, as the forward end of the lever engages the fruit riding over the wheel 19. Preferably, the lever 35 is formed with a downwardly inclined forward extension 38 and a head 39 is carried by the extension 38 and is disposed in substantially parallel relation to the lever 35. A branding element 40 is fixed in any suitable manner to the head 39 and projects slightly below the lower surface of the head 39 in order that the operating or working end of the element 40 may come into direct contact with the fruit F, as this fruit passes over the wheel 19. The head 39 intersects a vertical plane drawn through the axis of the shaft 20, so that when the fruit passes beyond the branding element 40 and the head 39, the fruit will roll forwardly and downwardly relative to the forward side of the wheel 19.

The branded fruit may then be moved to a suitable point or be discharged into a suitable receiver. The branding element 40 is constructed in the form of an electrically heated branding element and, as shown, the branding element 40 is fixed relative to the head 39. A pair of electrical conductors are adapted to be connected to the branding element 40, being extended through a casing 41, which may be fixed to the upper surface of the lever 39 by means of clips or fastening members 42.

The downward movement of the forward end of the carrier 34 is limited by means of a stop member 43, which extends transversely between the two side wall members 12, at a point above and rearwardly of the pivot member 36. Preferably the pivot member 36 and the stop member 43 are secured to a reinforcing plate 44, which is fixed to the inner sides of the side wall members 12. Preferably the carrier 34 is overbalanced slightly at its forward end so that the head 39 with the branding element 40 will gravitatingly swing downwardly into engagement with the fruit rolling over the wheel 19. The weight or rear extension 37 of the carrier 34 is adapted to engage the transversely disposed stop member 43 when the head 39 is lowered, so as to limit the downward swing of the head 39.

In the use and operation of this branding machine, the branding element 40 is adapted to be connected by means of the conductors in the casing 41, to a suitable source of electrical supply. The frame structure 10 is adapted to be positioned on the discharge end of an endless conveyor or at the lower end of a chute or runway, so that the fruit F may enter between the side walls 12 and roll downwardly over the guide or runway 17. The fruit F will gravitatingly move toward the wheel 19 so that the foremost article of fruit will be held into engagement with the wheel 19 and caused to reversely rotate, as shown by the arrows in Figure 1 and then to ride upwardly over the top of the wheel 19. As the fruit F rises on the wheel 19 and within the groove 22 thereof, the fruit will contact with the lowered branding element 40 and will raise the carrier 34 at its forward end while at the same time the fruit F is rolling over the wheel 19 in a direction reversely from the rotation of the wheel. The skin of the fruit F will come into contact with the branding element 40, and as the fruit is rotating beneath the branding element 40 and the head 39 the skin of the fruit will be seared or burnt with the desired indicia forming the branding element.

A branding machine may be constructed according to this invention at a relative small cost and it will be understood that as many runways as may be desired, may be disposed at the forward end of the endless conveyor or chute 16, and there may be as many branding element carriers 34 mounted on the pivot 36, as may be necessary to properly brand the fruit passing along the runways 17. This branding machine is of an exceedingly simple construction, so that it may be manufactured at a relatively small cost, and due to the simplicity of construction it will not readily get out of order and in addition it may be quickly and easily mounted at the discharge end of a conveyor or chute for branding the moving fruit. With a branding machine of this kind it is not necessary that the fruit be sized before it is branded, as the carrier 34 will operate with different sizes of fruit equally as well as with only one size of fruit. It will be, therefore, apparent that this machine may be positioned at a point in the conveying system of a fruit storage or packing establishment, where the fruit has not yet been sized, and due to the free swinging of the carrier 34 the fruit need not be of substantially globular form as the fruit may be of more or less irregular configuration and still be properly branded by the branding element 40.

What I claim is:

1. A fruit branding means comprising a pivoted brand carrier, a brand element fixedly carried by said carrier, an inclined runway beneath said carrier, and a fruit conveying wheel rotatably disposed beneath said element disposed on a horizontal axis and being formed throughout its upper edge with a circumferentially extending annular groove of V-shape cross section, a portion of said wheel being arranged at and extending above the lower end of said runway whereby an article of fruit will be rolling when received in said groove, elevated to a position for engagement with said element and simultaneously reversely rotated during rolling in said groove with respect to the rotation of said wheel.

2. In a fruit branding machine, a frame structure including a pair of side members, a front member, a rear member of greater height than the front member and a forward member connected to and extending rearwardly from the upper end of the front member, said side members being of greater height than and extending above the front and rear members, a forwardly extending downwardly inclined runway in said structure secured to said side members and seated at its rear on said rear member, the forward end of said runway being spaced from said forward member, a forwardly extending shiftable brand carrier pivotally supported at its rear from said side members above said runway, a brand element at the forward end of the carrier, and a fruit rolling wheel disposed on a horizontal axis journalled in said side members below said runway and forward member, said wheel having its upper portion extended between said forward member and runway and being formed throughout its upper edge with a circumferentially extending annular groove of V-shape cross section, said wheel being disposed below and arranged in alignment with said element.

3. In a fruit branding machine, a frame structure including a pair of side members, a front member, a rear member of greater height than the front member and a forward member connected to and extending rearwardly from the upper end of the front member, said side members being of greater height than and extending above the front and rear members, a forwardly extending downwardly inclined runway in said structure secured to said side members and seated at its rear on said rear member, the forward end of said runway being spaced from said forward member, a forwardly extending shiftable brand carrier pivotally supported at its rear from said side members above said runway, a brand element at the forward end of the carrier, a fruit rolling wheel disposed on a horizontal axis journalled in said side members below said runway and forward member, said wheel having its upper portion extended between said forward member and runway and being formed throughout its upper edge with a circumferentially extending annular groove of V-shape cross section, said wheel being disposed below and arranged in alignment with said element, guard members disposed at opposite sides of that portion of the wheel extended between said forward member and runway, and extensions carried by said forward member and runway and positioned in the groove of said wheel.

4. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a gravity lowering, forwardly directed, oscillatory brand element carrier disposed between the upper portions and pivotally supported forwardly of its rear end from said members, said carrier arranged over and extended forwardly of said carrier, a brand element fixedly connected to and depending from the forward terminal portion of said carrier, and a rotatable fruit rolling wheel arranged at and extending above the forward end of said runway, said wheel being journaled on a horizontal axis, arranged directly below said element and being formed with an endless V-shaped groove in its outer periphery for successively rolling the fruit off the runway in a direction and to an extent to be acted upon by said element and with the direction of the rolling action of the fruit being opposite to the direction of movement of the wheel.

5. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a gravity lowering, forwardly directed, oscillatory brand element carrier disposed between the upper portions and pivotally supported forwardly of its rear end from said members, said carrier arranged over and extended forwardly of said carrier, a brand element fixedly connected to and depending from the forward terminal portion of said carrier, and a rotatable fruit rolling wheel arranged at and extending above the forward end of said runway, said wheel being journaled on a horizontal axis, arranged directly below said element and being formed with an endless V-shaped groove in its outer periphery for successively rolling the fruit off the runway in a direction and to an extent to be acted upon by said element and with the direction of the rolling action of the fruit being opposite to the direction of movement of the wheel, said brand element intersecting the vertical plane of the vertical edges of said wheel.

6. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a gravity lowering, forwardly directed, oscillatory brand element carrier disposed between the upper portions and pivotally supported forwardly of its rear end from said members, said carrier arranged over and extended forwardly of said carrier, a brand element fixedly connected to and depending from the forward terminal portion of said carrier, a rotatable fruit rolling wheel arranged at and extending above the forward end of said runway, said wheel being journaled on a horizontal axis, arranged directly below said element and being formed with an endless V-shaped groove in its outer periphery for successively rolling the fruit off the runway in a direction and to an extent to be acted upon by said element and with the direction of the rolling action of the fruit being opposite to the direction of movement of the wheel, and means carried by and arranged between said members and engageable with the rear end of the carrier to limit the downward swinging of the carrier, said brand element intersecting the vertical plane of the vertical axis of said wheel.

7. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a forwardly directed oscillatory combined lever and brand element carrier disposed between the upper portions of and pivotally supported at its rear portion from said members, said carrier arranged over said runway, means fixed to and extending rearwardly of said lever for substantially balancing the lever, a downwardly offset head carried by the forward end of the lever, an electrically heated branding element carried by and depending from said head, a rotatable fruit rolling wheel arranged between said members, positioned directly below said head and disposed at and extending above the forward end of said runway, said wheel being journaled on a horizontal axis and formed throughout its outer edge with a circumferentially extending endless V-shaped groove for successively rolling the fruit, off the runway in a direction and to an extent to be acted upon by said element and with the rolling action of the fruit being opposite to the movement of the wheel, the lower forward end of said runway being disposed below a horizontal plane tangential to the top of the wheel.

8. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a forwardly directed oscillatory combined lever and brand element carrier disposed between the upper portions of and pivotally supported at its rear portion from said members, said carrier arranged over said runway, means fixed to and extending rearwardly of said lever for substantially balancing the lever, a downwardly offset head carried by the forward end of the lever, an electrically heated branding element carried by and depending from said head, a rotatable fruit rolling wheel arranged between said members, positioned directly below said head and disposed at and extending above the forward end of said runway, said wheel being journaled on a horizontal axis and formed throughout its outer edge with a circumferentially extending endless V-shaped groove for successively rolling the fruit off the runway in a direction and to an extent to be acted upon by said element and with the rolling action of the fruit being opposite to the movement of the wheel, the lower forward end of said runway being disposed below a horizontal plane tangential to the top of the wheel, and guard means on the upper portion of the opposite sides of said wheel extending from the latter to said members.

9. In a branding machine for fruit of substantially spherical form adapted to be positioned at the discharge end of and for receiving from a conductor moving fruit which is to be branded, said machine including a supporting structure having a pair of spaced parallel vertical supporting members, a forwardly extending downwardly inclined runway arranged between said members below the upper ends of the latter and forming a continuation of and for receiving the fruit to be branded from the conductor, a forwardly directed oscillatory combined lever and brand element carrier disposed between the upper portions of and pivotally supported at its rear portion from said members, said carrier arranged over said runway, means fixed to and extending rearwardly of said lever for substantially balancing the lever, a downwardly offset head carried by the forward end of the lever, an electrically heated branding element carried by and depending from said head, a rotatable fruit rolling wheel arranged between said members, positioned directly below said head and disposed at and extending above the forward end of said runway, said wheel being journaled on a horizontal axis and formed throughout its outer edge with a circumferentially extending endless V-shaped groove for successively rolling the fruit off the runway in a direction and to an extent to be acted upon by said element and with the rolling action of the fruit being opposite to the movement of the wheel, the lower forward end of said runway being disposed below a horizontal plane tangential to the top of the wheel, guard means on the upper portion of the opposite sides of said wheel extending from the latter to said members, and said structure and runway including spaced extensions projecting into the front side and rear side of the groove above the axis of the wheel.

ELBERT BRESHEAR, Jr.